Figure 1:
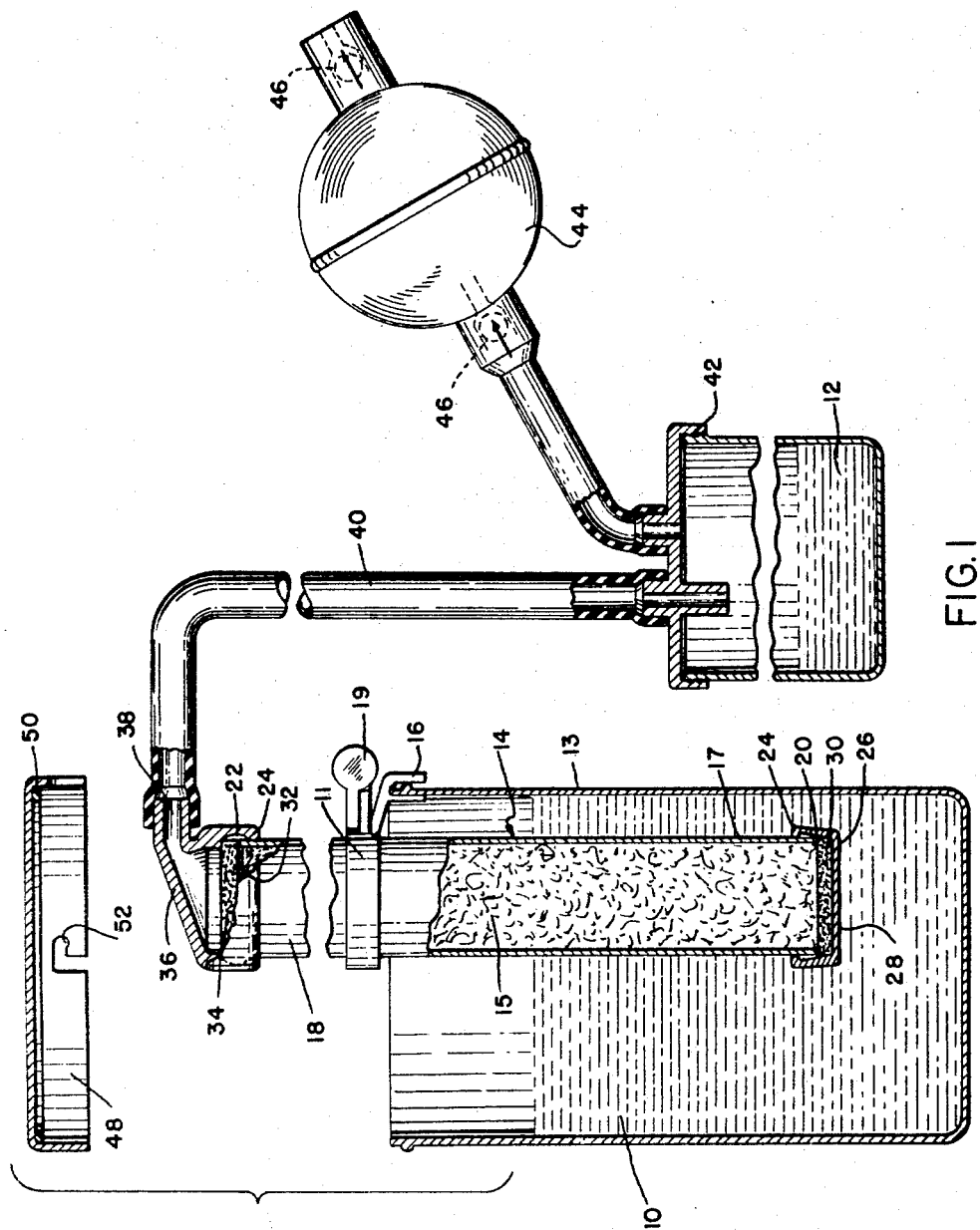

May 20, 1969  P. S. LITT  3,445,000
WATER PURIFICATION

Original Filed Oct. 15, 1962

INVENTOR.
PETER S. LITT

BY
ATT'Y.

United States Patent Office 3,445,000
Patented May 20, 1969

3,445,000
WATER PURIFICATION
Peter S. Litt, Albuquerque, N. Mex., assignor of twelve percent each to Walter B. Hobbs, Evanston, Ralph K. Ball, Kenilworth, and Watson D. Harbaugh, Evanston, Ill.
Application Oct. 15, 1962, Ser. No. 233,996, now Patent No. 3,389,079, dated June 18, 1968, which is a continuation-in-part of application Ser. No. 194,135, May 11, 1962. Divided and this application Apr. 18, 1963, Ser. No. 276,688
Int. Cl. B01j 1/06; C02b 1/16
U.S. Cl. 210—94                                4 Claims This application is a continuation-in-part of my co-pending application Ser. No. 194,135, filed May 11, 1962 and now abandoned, and a division of my application Ser. No. 233,966, filed Oct. 15, 1962 and now Patent No. 3,389,079, as to FIGURE 1 herein.

This invention relates to a low cost method and apparatus for reclaiming usable water from any bodies of known contaminated water, such as, for an example, sea water.

The invention contemplates the use of inexpensive and readily available additives, such as calcium hydroxide and calicum sulphate or the like, not only to control movements of organic particles, including hydrocarbons, but also because they are readily detected even in small quantities in the product water; controlling the movement of ionically influenced particles in a body of contaminated water and separating them from water molecules for selective removal; reducing all the contaminant in feed water to a common denominator of ionization behavior and moving by diffusion and negative gauge pressure product water from the feed water more rapidly through a diffusion mass then the ions can travel; and by rejecting ions from a mist or vapor of feed water and collecting product water therefrom under a negative gauge pressure; and by reducing a high alkalinity pH (12 to 13) of feed water to a neutral pH (6.5 to 7.5) without adding neutralizing reagents.

One of the objects of this invention is to provide a process and apparatus for the acceleration of water molecular flow and controlling the ions of impurities in the presence of negative gauge pressure.

Another object of the invention is to free from a body of contaminated water, mists or vapor of the water for contact with air molecules over large interface surfaces on both sides in the presence of reduced pressure to free water molecules at the surfaces in greater numbers from contact with contaminating ions as a purification step and collecting the films of reduced contamination as product water for further purification in a diffusion mass.

Another object of the invention is to provide a water reclamation system in which ion movement in contaminated water is retarded in the movement through a diffusion mass by indiscriminate and random translational movement of the ions and water molecules in the mass, while the molecular activity is increased and the water molecules in the mass are accelerated predominantly in one direction by the presence of negative gauge pressure.

Another object of the invention is to provide a continuous running high volume, small sized water reclamation system for potable water in one stage which system may be backwashed or purged when necessary.

Another object is to conserve or eliminate the use of product waters to purge equipment and thereby induce a greater yield of product water from ion contaminated water.

The invention also provides an apparatus for purifying water whose constructional costs and space requirements are a small fraction of conventional equipment; whose moving parts are few and essentially comprise conventional pumps, motors and automatic control elements; whose external energy requirements in large installations are a small fraction of that required for conventional equipment and little or no energy is required in small volume devices such as survival equipment for families, individuals and travel; and, whose apparatus is made of inexpenesive, readily available, corrosion and vermin proof materials.

Figure 2:
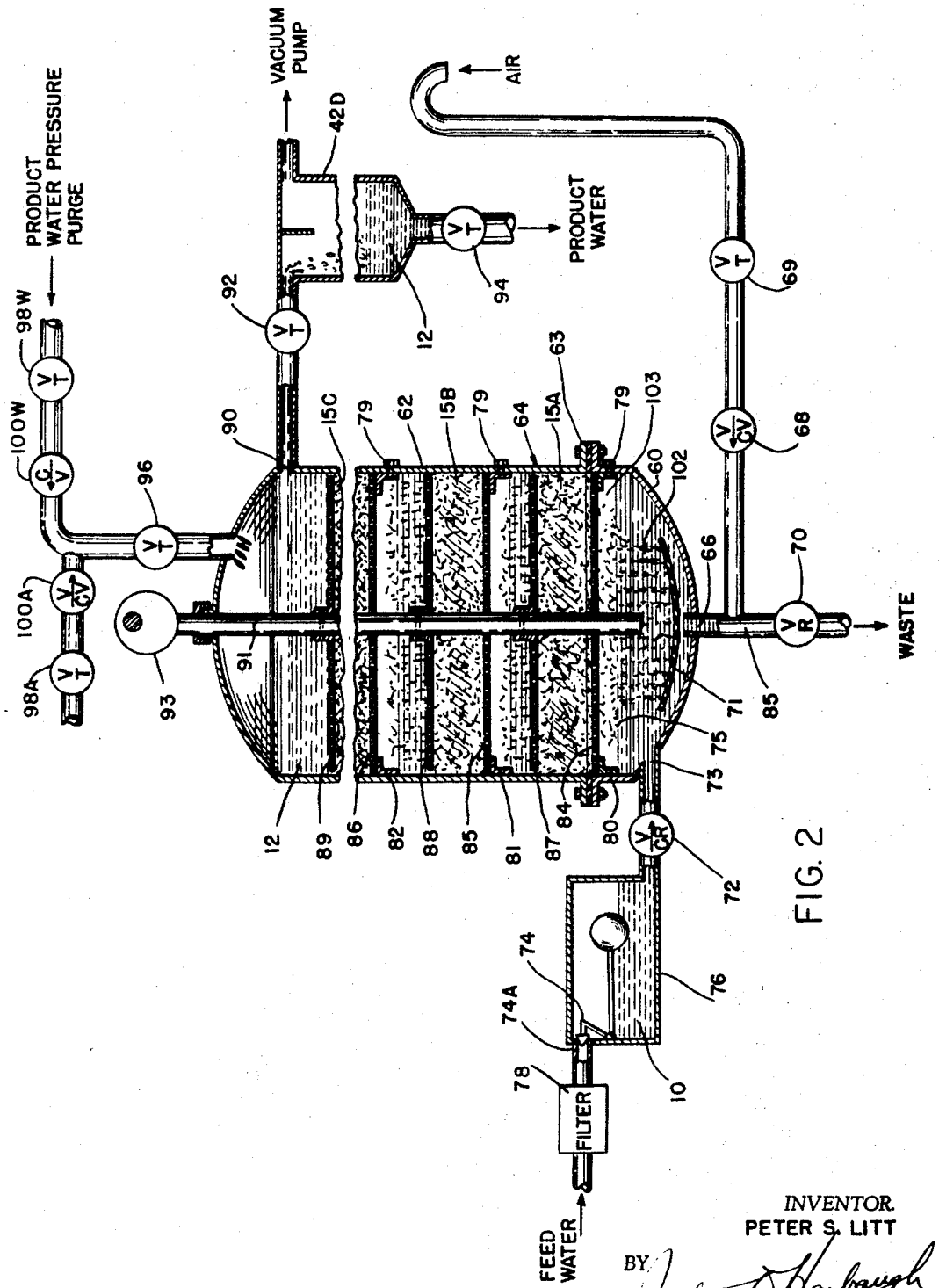

Other objects of the invention will be appreciated from the description of the drawings in which several embodiments of the invention are illustrated schematically for carrying out various phases of the process in which:

FIG. 1 is a diagrammatic view of a batch method and apparatus for purifying water in a single stage for survival or family kits with the utilization of a diffusion mass and negative gauge pressures; and FIG. 2 is a diagrammatic view of a method and apparatus showing a modification embodiment of the invention.

For better understanding of the new invention, I have noted that all water dissolved contaminants, other than undissolved heavy or gross solids which can be readily removed by conventional mechanical filters, can be handled according to particle diffusion of ionic contaminants of a water solution. Some substances such as organic wastes which include microscopic plant and sub-microorganisms, and both soluble and insoluble hydrocarbons including oils and dyes, do not ionize readily in water while certain mineral compounds partially soluble in water such as inexpensive calcium compounds including calcium hydroxide $Ca(OH)_2$ and calcium sulphate $CaSO_4$ not only ionize in water adequately in small quantities, but also have a known affinity for such organic particles in solution.

"Diffusion mass" as used herein contemplates a body or a mass preferably comprising felt-like matting of inert material defining a labyrinth of minute irregular circuitous capillary-like passages and cavities therethrough compacted enough to trap, delay or retard the passage of ions of impurities while permitting water molecules of contaminated water to pass freely yet will not have any passages of a size which serve merely as siphon conduits. Such a mass is found in native or synthetic felted fine wool and in certain mineral materials such as exfoliated aluminum silicate and metal such as nickel crystals. These may be reinforced with filamentous materials such as nylon, Dacron, threaded native or synthetic wool, or metallic filaments, so long as the reinforcing elements do not provide siphon conduits.

In applications where small amounts of potable water are desired on the order of a gallon per day, a small refillable container can be employed with a diffusion mass unit made of materials capable of capillary diffusion such as a body of the materials mentioned. The diffuser unit is body of the materials mentioned. The diffuser unit is sealed from air throughout its length and one open end of the diffuser is lowered into a container holding the solution and the other open end is preferably subjected to negative gauge pressure. Then the water molecules will pass freely through the full length of the diffusion mass.

The recovery of the product water at the top of the diffuser can continue until the ions of impurities begin to appear at the top. Then the diffusion mass can be lifted free, purged or discarded. The container is emptied and refilled with more impure water solutions and the purged or a new diffusion mass is returned to its working position. The unit may be immersed directly into the source of the feed waters thereby eliminating the container, if desired.

The device shown in FIG. 1 is a survival kit which includes a negative gauge pressure inducing device. A container 13 is filled with a mixture or a solution of feed water 10 and a diffusion mass is inserted part way through a clamp ring 11 that is forked as at 16 to be received in supported relationship on the edge of the container and manipulated by squeezing terminal ears 19. As supported one end 17 is immersed in the solution 10 and the other end 18 extends above the container 13.

More than one diffusion mass assembly can be used at a time or alternately if desired on the side of the container 13 if greater production of water is desired in a given time. The quantity of water recovered in a given length of time is proportional to the cross-sectional area and inversely proportional to the density of the diffusion mass. The time cycle between purgings is proportional to the length of the lattice.

The diffusion mass unit comprises a cartridge element which includes a sealer coating or plastic tube 18 made preferably of high density polyethylene filled during or after molding with compacted fibrous material, such as fine wool or equivalent, or compacted exfoliated aluminum silicate which can be removed for purging and recompacted as desired.

Attachable cups 20 and 22 made either of an acrylic or polystyrene material close the ends of the tube in sealed relationship. Each preferably has at its edges inwardly directed bead-like flanges 24 of an inside diameter normally less than the outside of the diameter of the tube 18 to engage the outside surface of the tube in removable clamping sealed relationship. A bayonet or threaded joint can be used for securement if desired.

At the upper end of the tube two inserts or wafers are preferably provided and held in place by the upper cap 22 above the diffusion mass. These may be made integrally or separately. The upper one 32 provides an activated charcoal filter layer to remove odors and bad taste and the other one 34 is a high contamination indicator. The constituents of the indicator 34 do not dissolve but will change color when contacted with ions present in the water passing therethrough. This color indicator is a standard industrial item. The upper cap is transparent so that a change in color of the wafer 34 can be detected.

The bottom wall 26 is perforated with small openings 28 to permit water to pass therethrough from the container 13 to the diffusion mass 15 and supports a wafer insert 30 between them when desired. The insert is composed of a foraminous material impregnated with or supporting particles of $Ca(OH)_2$ for gradual dissolution into the water passing into the openings 28. This wafer is used essentially when organic contamination may be present in the feed water 10 and such captivates organic particles as already mentioned as well as cooperating with the ion contamination detector already described. Also in this connection a preliminary treatment of sea water by a vacuum draw of the sea water through a block of gypsum ($CaSO_4$) will collect the salt (35,000 p.p.m.) on the bottom of the block and result in a product water of a concentration of $CaSO_4$ (2,500 p.p.m.).

The shape of the upper cap as shown provides a boss and chamber 36 having an outlet 38 to which a hose 40 is attached leading to an aspirator type collector bottle 42 in which a negative gauge pressure is induced by a squeeze bulb pump 44 having its check valves 46 oriented as shown. The use of a negative gauge pressure at the top of the diffusion mass counteracts the effect of gravity upon the water molecules in the liquid solid column present in the mass so that the diffusion or capillary action is not burdened thereby. In order to do this the negative pressure at the top need only be that which is effective at the bottom of the columns to support the column, namely, the pressure developed at the bottom should be zero or a slightly negative gauge pressure.

This would allow for the factor of porosity in the mass and consigns the movement of the water molecules in the water to the diffusion action of the mass with the ions still subject to gravity without a forced flow.

Operation of the bulb 44 induces this negative gauge pressure in the cap 22 to eliminate the effect of gravity on the water in the diffusion mass 15. This not only counteracts gravity but also accelerates molecular activity of the water molecules ahead of ions that might enter the mass. Thus, purified water will flow to the collector cup 42 for a period of time before ions begin to appear. When they do, they will change the color of the upper indicator layer 34 and the operation can be stopped. Thereafter the caps can be removed and the mass 15 either purged or discarded and a renewed one placed in operation.

All elements described except possibly the diffusion mass cartridge elements 14 can be stored in the container when not in use by a closure element 48 as sealed by a gasket 50 to the open end of the container by a bayonet joint 52.

Attachable cup 22 preferably made either of an acrylic or polystyrene closes the upper end of the diffusion mass (or tube 18), and preferably has at its edge inwardly directed bead-like flange 24 of an inside diameter normally less than the outside diameter of the upper end of the diffusion mass 15 (or to engage the outer upper surface of the tube 18) to form a removable clamping sealed relationship.

A cup 20 preferably made of the same material as the upper cup 22 may be placed on the lower end of the diffusion mass (or tube 18). The bottom wall 26 of cup 20 is perforated with small openings 28 to permit the feed water to pass therethrough from the container 13 to the diffusion mass 15, and also may support a wafer insert 30 between them when desired. The insert is composed of a foraminous material impregnated with or supporting particles of $Ca(OH)_2$. It is used essentially when organic contamination may be present in the feed water 10 and such captivates organic particles.

The modification shown in FIG. 2 discloses a power driven high production unit. As shown therein two half shells, 60 and 62, having mating radial flanges 63 are bolted together to form a tank 64. The lower shell 60 has an opening 66 in the bottom thereof connected through a T-fitting 85 and check valve 68 to the atmosphere to permit air to flow into the tank as metered by adjustable valve 69. A foraminated air inlet wall 71 is supported over the opening 66. The tank may be drained through the T-fitting and a pressure relief valve 70 to waste as desired.

The tank is supplied with feed water through a check valve 72 and opening 73 and is normally kept at a predetermined level 75 by a float valve 74 in a supply tank 76. Preferably, a mechanical filter 78 is provided upstream to assure the removal of any solids before the feed water enters the system.

Spaced radial inwardy extending flanges secured on the inner walls of the tank 64 by bolts 79 are provided at 80 on the lower shell 60 and at 81 and 82 in the upper shell 62 to support among them multi-stage diffusion masses 15A, 15B and 15C supported between lower foraminated plates 84, 85 and 86, resting on the flanges 80, 81 and 82 respectively, and upper plates 87, 88 and 89 mounted upon a piston rod 91 which is driven by a cam 93 which compacts the masses for operation and releases them for purging. As shown in the drawing the flanges 80, 81 and 82 retain the foraminous plates and the diffusion masses in fixed spaced positions at all times. Thus, fluid can pass in either direction through the plates and diffusion mass depending upon the direction of fluid flow, i.e., during normal operation or when the unit is purged. The diffusion masses 15A, 15B and 15C may be the identical substances as described with reference to the device of FIG. 1. The spacing will be discussed subsequently.

An outlet 90 opens through a valve 92 to a collector 42D that is subjected to negative gauge pressure by a vacuum pump (not shown). The walls of the collector are transparent so the height of the product water may be observed. The product water 12 may be removed from the collector through a valve 94.

At the top of the upper shell 62 product water and air under pressure may be injected into the tank separately or simultaneously through the throttle valve 96 as controlled by throttle valves 98A and 98W and as protected against back flow by check valves 100A and 100W for either Air or Water separately, to purge the diffusion masses 15A, 15B and 15C. The valve 92 must be closed and the vacuum pump operation stopped during purging.

In operation, the masses are compacted by the cam 93, the waste valve 70 is closed and feed water fills the tank to a level 75 within an inch or two of the lower plate 84. The vacuum valve 92 is opened and a negative gauge pressure is induced above the upper plate 89 which becomes effective through the diffusion masses 15A, 15B and 15C to the body of feed water 10. Air then begins to flow into the tank through the opening 66 below the perforated diffusion plate 71 and will bubble through the feed water as shown at 102 and cause bubbles or a mist to be created in the space 103 above the feed water to pass upwardly through the body of the diffusion mass 15A.

Water and air will move upwardly through the mass 15A and through the plate 87 and begin to collect until the level thereof approaches close enough to the plate 85 for bubbles or mist to bridge the remaining distance whereupon a stable level will be kept by the water and air pickup moving through the second mass 15B. The same will be repeated for the next space and next mass 15C with the end result that product water will collect above the top plate 89 and run off to the collector 42D.

The diffusion masses may be purged of ions regularly and quickly after the piston 91 and plates 87, 88 and 89 are raised and, in this connection it should be noted that the space between the masses can be anything required to loosen the masses from compaction. The collecting water accommodates the situation. The vacuum valve 92 is closed, the vacuum pump stopped, and the purging valve 96 and the air valve 98A are opened. Air will flow under pressure downwardly through the diffusion masses, slowly at first as the spaces and lower shell 60 are emptied of water to waste and then rapidly to jettison liquid therefrom including ions in solution therewith. As moisture is reduced in the diffusion masses some ions will reassociate and be blown clear by the air. This greatly reduces the presence of residual ions in the diffusion masses and a short injection burst of product water through valve 98W into the air stream will purge most of these from the diffusion masses. Thereupon the apparatus can be returned to operation by closing valve 96, actuating the piston 91 and again opening valve 92 and energizing the vacuum pump.

Where the air space such as shown at 103 is used frequency of purging is reduced manyfold. This is believed to be caused by some diffusion of the ions of impurities in the air space 103. This is true of the other spaces also.

It has been found that the distance between the water level and the grid plate 84 should be between ½ and 1½ inches for best results with a negative pressure above plate 89 high enough to develop approximately a negative pressure of 2 to 4 inches of water column at diffuser 71. When there is a 1 inch air spacing and the diffuser unit has a diameter of 6 inches and a thickness of 6 inches approximately 250 ml. of product water will be produced per minute. Five to six gallons of product water can be recovered from sea water (35,000 p.p.m.) between purgings. Under these circumstances it is desirable to use about a pint of product water in the purging cycle. The vacuum at outlet 90 and setting of valve 69 are adjusted so that the flow of air through the tank will cause the water laden bubbles to touch the grid 84. Negative gauge working pressure at 90 will range from 1 to 5 lbs. and the positive gauge purging pressure at 96 is approximately 15 p.s.i. It may be noted that purgings of the diffuser element are dependent on the contaminants in p.p.m. of the feed water. It will also be appreciated that by turning off the air at 69 and raising the level 75 the tank 64 becomes filled with liquid to the outlet 90 for operation similar to FIG. 1.

Having thus described the invention and various embodiments thereof it will be appreciated by those skilled in the art how the objects and operation of the invention set forth herein are fulfilled and accomplished and how various and further embodiments and modifications can be made including by reference, those of my co-filed applications, Ser. No. 194,135 (filed May 11, 1962) and Ser. No. 233,996 (filed Oct. 15, 1962) without departing from the spirit of the invention, the scope of which is commensurate with the appended claims.

What is claimed is:

1. An apparatus for reclaiming product water from a feed water solution of ion content comprising:
   a container having a body of feed water in it,
   an elongated compressible diffusion mass exposed at both end portions, one of said end portions being immersed in said body of water,
   said diffusion mass comprising a felt-like matting of inert material defining a labyrinth of minute irregular circuitous capillary-like passages capable of moving water molecules by diffusion faster than ions can travel therethrough,
   means for externally sealing the diffusion mass from atmosphere and water over its remaining surface portions,
   means connected to the other end portion for subjecting said diffusion mass to negative gauge pressure,
   means for collecting the product water passing through said diffusion mass, said one end portion being provided with a cup member having its bottom wall perforated,
   said cup carrying an alkali earth compound soluble in water for progressive disassociation into ion particles in the feed water supplied to said diffusion mass.

2. An apparatus for reclaiming product water from a feed water solution of ion content comprising:
   a container having a body of feed water in it,
   an elongated compressible diffusion mass exposed at both end portions, one of said end portions being immersed in said body of water,
   said diffusion mass comprising a felt-like matting of inert material defining a labyrinth of minute irregular circuitous capillary-like passages capable of moving water molecules by diffusion faster than ions can travel therethrough,
   means for externally sealing the diffusion mass from atmosphere and water over its remaining surface portions,
   means connected to the other end portion for subjecting said diffusion mass to negative gauge pressure,
   means for collecting the product water passing through said diffusion mass,
   said means connected to the other end portion including a transparent member and an ion indicator which changes its visible characteristics when contacted by the ion particles, and which also includes
   an activated charcoal filter.

3. An apparatus for reclaiming feed water from a feed water solution of ion content comprising:
   a container having a body of feed water in it,
   an elongated diffusion mass exposed at both end portions,
   said diffusion mass comprising a felt-like matting of insert material defining a labyrinth of minute irregular circuitous capillary-like passages capable of moving water molecules by diffusion faster than ions can travel therethrough,
   means for sealing the diffusion mass from atmosphere over its remaining surface portions, means connected to one end portion for subjecting said diffusion mass to negative gauge pressure including an element for collecting water that has passed through the diffusion mass, means for holding the other end portion submerged in said body of feed water, said last means defined including an element carrying an alkali earth compound soluble in water for progressive disassociation into ion particles in the feed water supplied to said other end portion of the diffusion mass.

4. An apparatus for reclaiming feed water from a feed water solution of ion content comprising:

a container having a body of feed water in it, an elongated diffusion mass exposed at both end portions, said diffusion mass comprising a felt-like matting of inert material defining a labyrinth of minute irregular circuitous capillary-like passages capable of moving water molecules by diffusion faster than ions can travel therethrough, means for sealing the diffusion mass from atmosphere over its remaining surface portions, means connected to one end portion for subjecting said diffusion mass to negative gauge pressure including an element for collecting water that has passed through the diffusion mass, means for holding the other end portion submerged in said body of feed water, said means connected to said one end portion including a translucent member and an ion indicator which changes its visible characteristics in contact with ion particles.

References Cited
UNITED STATES PATENTS 3,309,843  3/1967  Rigopulos et al. _____ 55—35
3,236,768  2/1966  Litt _____ 210—23

REUBEN FRIEDMAN, *Primary Examiner.*

W. S. BRADBURY, *Assistant Examiner.*

U.S. Cl. X.R.

210—198, 237, 321, 406, 96